United States Patent Office 3,090,805
Patented May 21, 1963

3,090,805
VITAMIN A HALOBENZOATES
Balthasar Hegedüs, Binningen, Otto Isler, Basel, Rudolf Rüegg, Bottmingen, and Gottlieb Ryser, Basel, Switzerland, assignors to Hoffmann-La Roche Inc., Nutley, N.J., a corporation of New Jersey
No Drawing. Filed July 20, 1960, Ser. No. 44,002
Claims priority, application Switzerland Sept. 15, 1959
3 Claims. (Cl. 260—476)

It is known that vitamin A is especially sensitive to oxygen. It decomposes in the presence of air merely upon exposure for several hours. The presently known esters of vitamin A show similar high instability. By the addition of antioxidants, for example α-tocopherol, to vitamin A compositions it is possible to improve the stability of vitamin A, although this approach for many purposes is still not satisfactory.

It has now been surprisingly found that certain substituted benzoic acid esters of vitamin A, by themselves and without the addition of antioxidants, have remarkably high stability. Accordingly it is an object of this invention to provide stabilized forms of vitamin A.

The stable esters of vitamin A of this invention are substituted benzoic acid esters of vitamin A containing one to three halogen groups, preferably chloro groups, or one to three lower alkoxy groups in the benzene ring. The invention also relates to substituted benzoic acid esters of vitamin A containing two nitro groups or one nitro group in o- or m-position of the benzene ring. By way of illustration the following stable vitamin A esters may be cited: Vitamin A m-nitrobenzoate, vitamin A o-nitrobenzoate, vitamin A 3,5-dinitrobenzoate, vitamin A p-chlorobenzoate, vitamin A p-methoxybenzoate and vitamin A 3,4,5-trimethoxybenzoate and the like.

These esters may be obtained by the esterification of vitamin A with a benzoic acid appropriately substituted with halogen, lower alkoxy or nitro groups, or a reactive derivative thereof. Especially useful reactive acid derivatives include the acid halides, especially the acid chloride, and the acid anhydrides.

The vitamin A esters described above may also be obtained by trans-esterification. For example, a lower carboxylic acid ester of vitamin A, e.g. vitamin A acetate, can be heated with an ester formed from a lower aliphatic alcohol and a halogen, lower alkoxy or nitro-substituted benzoic acid, preferably o-nitrobenzoic acid, m-nitrobenzoic acid, 3,5-dinitrobenzoic acid, p-chlorobenzoic acid, p-methoxybenzoic acid or 3,4,5-trimethoxy-benzoic acid. The trans-esterification reaction is preferably effected in the presence of a trans-esterification catalyst, for example alkali metal hydroxides or alkali metal alcoholates, with the continuous removal of the lower aliphatic alcoholic esters of the lower carboxylic acids formed as byproducts.

The substituted benzoic acid esters of vitamin A of this invention are stable vitamin-active substances which may be used in the same manner as known vitamin A esters such as the acetate.

The following examples illustrate how the substituted benzoic acid esters may be produced. All temperatures are expressed on the centigrade scale.

Example 1

8 g. of m-nitrobenzoyl chloride were dissolved in 70 ml. of pyridine. The solution was cooled to +10°. 10 g. of vitamin A alcohol were added and the reaction mixture was permitted to stand at room temperature for 5 hours. The solution was poured into ice water and extracted with 250 ml. of ether. The ether solution was then washed twice with 200 ml. portions of water, once with 200 ml. of 3% sulfuric acid, again with water, then with 200 ml. of 1% sodium bicarbonate solution and finally once more with water. After drying the ether solution over sodium sulfate and then evaporating the ether, a yellow viscous oil was obtained which was dissolved in 100 ml. of petroleum ether (boiling range 60–90°). A small amount of undissolved material was filtered off and vitamin A m-nitrobenzoate crystallized upon standing at 0° in the form of orange-red prisms, M.P. 78°, absorption maximum at 326 m$\mu$, $E_1^1$=1130 (in alcohol).

Example 2

10 g. of vitamin A alcohol were added at a temperature of +10° to a mixture of 8.4 g. of 3,5-dinitrobenzoyl chloride in 120 ml. of pyridine. The reaction mixture was then allowed to stand at room temperature for one hour and worked up according to the procedure described in Example 1. Vitamin A 3,5-dinitrobenzoate was obtained in the form of a crystalline residue. This was recrystallized from petroleum ether (boiling range 90–110°), whereupon red prisms were obtained which slowly decomposed above 150°, absorption maximum at 328 m$\mu$, $E_1^1$=1020 (in alcohol).

Example 3

6.1 g. of p-chlorobenzoyl chloride were dissolved in 80 ml. of pyridine. 10 g. of vitamin A alcohol were added to the resulting solution at 10° and the mixture was allowed to stand at room temperature for 5 hours. The product was worked up by the procedure described in Example 1. The crude vitamin A p-chlorobenzoate thus obtained was dissolved and recrystallized from acetone-methanol in the form of colorless plates, M.P. 77–78°, absorption maximum at 327 M$\mu$, $E_1^1$=1255 (in alcohol).

Example 4

8 g. of 3,4,5-trimethoxybenzoylchloride were dissolved in 70 ml. of pyridine. 10 g. of vitamin A alcohol were added and the mixture was allowed to stand at 20° for 4 hours. The solution was poured into water and extracted with ether. The ether solution was then washed with water, dilute sulfuric acid, sodium bicarbonate solution and again with water. After drying over sodium sulfate and evaporation of the ether the resulting crude product was purified by filtration through a column containing 450 g. of aluminum oxide (deactivated with 10% water). The fractions collected from the aluminum oxide column by means of petroleum ether and a petroleum ether solution containing 5% of ether were concentrated and crystallized from acetone (at −70°) and from petroleum ether. The vitamin A 3,4,5-trimethoxy benzoate obtained melted at 80° absorption maximum at 327 m$\mu$, $E_1^1$=1090 (in alcohol).

Having now particularly described and ascertained the nature of our said invention and in what manner the same is to be performed, we declare that what we claim is:

1. A vitamin A ester of the formula:

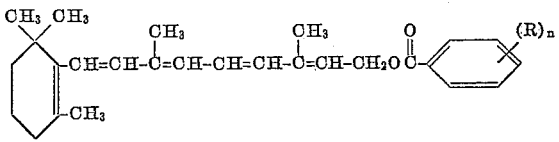

in which R is a halogen atom and in which $n$ is an integer from 1 to 3.

2. Vitamin A mono-chlorobenzoate.
3. Vitamin A p-chlorobenzoate.

References Cited in the file of this patent
UNITED STATES PATENTS

| | | |
|---|---|---|
| 2,169,195 | Hickman et al. | Aug. 8, 1939 |
| 2,434,687 | Embree et al. | Jan. 20, 1948 |
| 2,443,473 | Milas | June 15, 1948 |
| 2,623,897 | Van der Kerk | Dec. 30, 1952 |
| 2,822,380 | Clinton | Feb. 4, 1958 |